June 15, 1937.                C. O. COZZENS                2,083,831
                            CONNECTING MEANS
                         Filed March 2, 1934            2 Sheets-Sheet 1
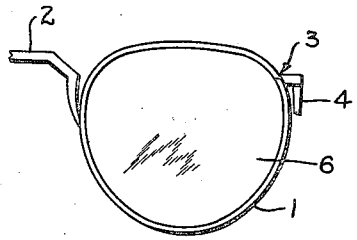
FIG. I
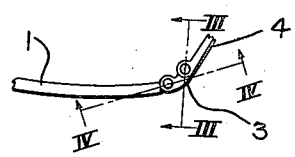
FIG. II
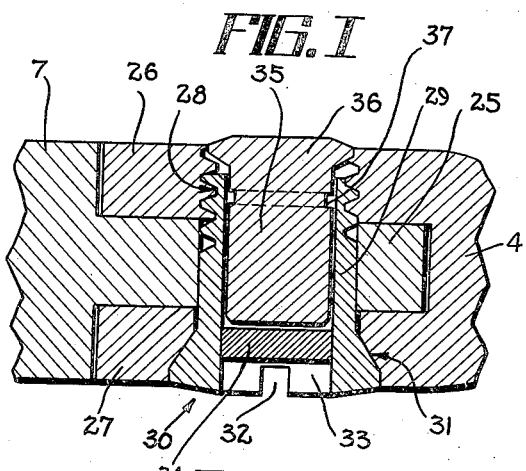
FIG. III
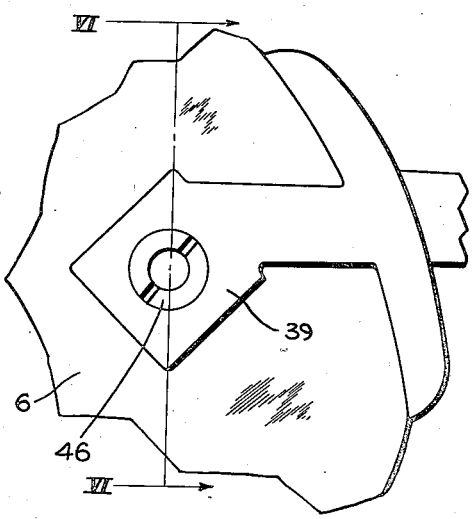
FIG. V
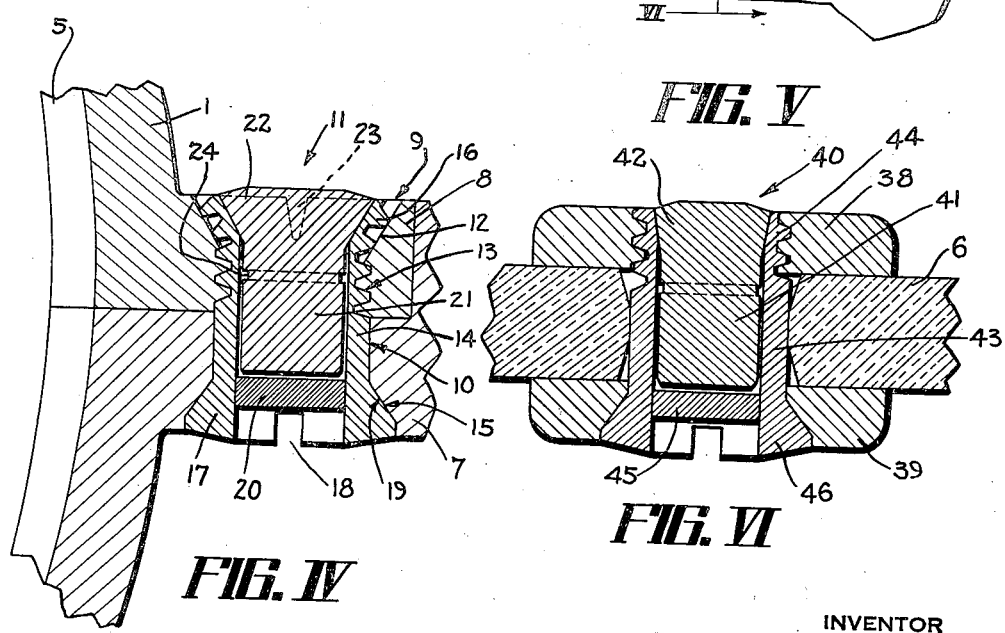
FIG. IV          FIG. VI
INVENTOR
Charles O. Cozzens
BY
Harry H. Styll.
ATTORNEY June 15, 1937.  C. O. COZZENS  2,083,831
CONNECTING MEANS
Filed March 2, 1934  2 Sheets-Sheet 2
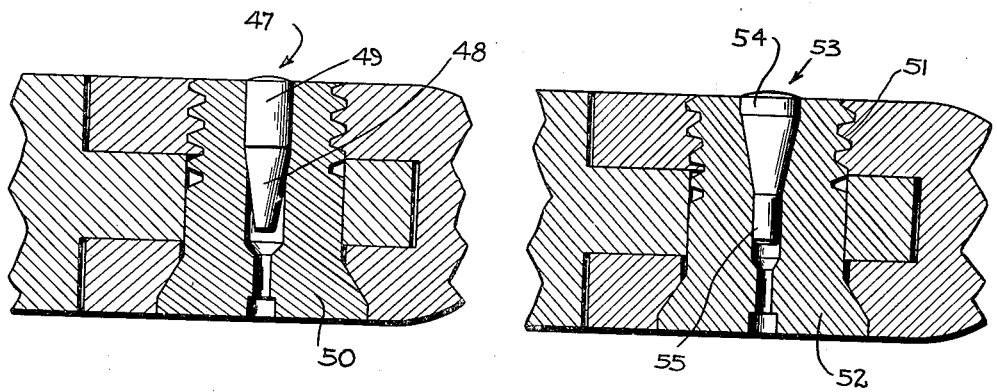
FIG. VII  FIG. VIII
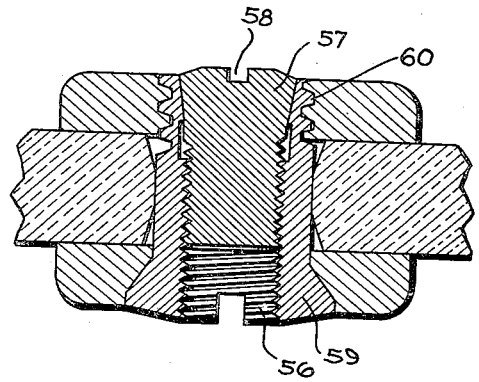
FIG. IX
INVENTOR
Charles O. Cozzens
BY
Harry H. Styll
ATTORNEY Patented June 15, 1937

2,083,831

UNITED STATES PATENT OFFICE 2,083,831

CONNECTING MEANS

Charles O. Cozzens, Southbridge, Mass., assignor to American Optical Company, Southbridge, Mass., a voluntary association of Massachusetts Application March 2, 1934, Serial No. 713,759

2 Claims. (Cl. 88—47)

This invention relates to improvements in connecting or securing means and has particular reference to improved means for aligning and holding the operable and separable parts of an ophthalmic mounting together and to an improved process of making the same.

One of the principal objects of the invention is to provide improved means and method of making connecting or securing means whereby the parts being united may be secured in proper relation with each other and the securing means may thereafter be locked against backing out and becoming loose.

Another object of the invention is to provide an improved connecting or securing device that is inconspicuous and so constructed that the working parts of the connected means may be tightened to such an extent as to obtain the desired operable bearing friction therebetween, and may thereafter be more or less permanently locked and held in said relation.

Another object is to provide solder type anchor means and method of applying the same for locking the securing means in its fitted relation with the parts to be connected.

Another object is to provide improved means and method of forming connecting or securing means of the above character which may be retightened to take up looseness due to wear without having to first remove or loosen the anchor means and which may thereafter be reanchored in its adjusted position.

Another object is to provide simple, efficient and economical means and process of making said means whereby the operable and separable parts of an ophthalmic mounting may be more or less permanently secured in working position.

Other objects and advantages of the invention will become apparent from the following description taken in connection with the accompanying drawings and it will be apparent that many changes may be made in the details of construction, arrangement of parts and steps of the process shown and described without departing from the spirit of the invention as expressed in the accompanying claims. I, therefore, do not wish to be limited to the exact details of construction, arrangement of parts and steps of the process shown and described as the preferred forms only have been shown by way of illustration. It will also be apparent that the device may have many uses and applications to other arts than the one specifically described herein and all of which are embodied in this invention.

Referring to the drawings:

Fig. I is a fragmentary front elevation of an ophthalmic mounting embodying the invention;

Fig. II is a fragmentary plan view of the temporal side of the ophthalmic mounting shown in Fig. I;

Fig. III is an enlarged sectional view taken on line III—III of Fig. II;

Fig. IV is an enlarged sectional view taken on line IV—IV of Fig. II and showing a modified form of the invention;

Fig. V is a fragmentary front elevation of a lens holding member for a rimless type mounting;

Fig. VI is an enlarged sectional view taken on line VI—VI of Fig. V and showing another modified form of the invention; and Figures VII, VIII and IX are views similar to Fig. III showing further modifications.

It is well known that in ophthalmic mountings as heretofore provided the temple, rim, lens and like connections employed in conjunction therewith have proven very unreliable and troublesome by reason of the fact that the screw means, or securing members employed in connection therewith were very apt to work loose, with the result that the temples or other parts of the mounting become loose and wabbly and do not properly support the lenses before the eyes, etc. Most of the difficulties were found in the past to be due to the fact that the screws or securing portions of the connecting means were acted on by the ratchet action of the temples as they were folded and opened during their use or by the working of the rims, or lenses on their connecting means during the use of the mounting.

The above defects have been dealt with individually by applicant and a finished mounting having a combination of the improved elements has been constructed to prevent the temples or other parts from becoming loose and wabbly, insuring longer life and durability and also permitting rigid clamping of the parts in proper fitted relation with each other and more or less permanently securing said parts in said relation.

Referring more particularly to the drawings wherein like characters of reference designate like parts throughout the several views, in Figures I to IV inclusive the invention is shown applied to the temple and rim connections of a frame type mounting comprising a pair of split lens rims 1 connected centrally by a bridge member 2 and provided adjacent the splits with rim connecting means 3 which also form an attachment for the temples 4 to the rims. The rims 1 are provided with a lens groove 5 to hold the lenses 6 in place therein and are provided on one end of the split ends with a housing 7, and on the opposite end with a connecting member 8. The housing 7 is provided with a recess adapted to receive the end of the split rim and the attached connecting member 8. The connecting member 8 has an attaching opening 9 therein in aligned relation with an attaching opening 10 formed in the housing in which the connecting means 11 is mounted. The opening 9 in the member 8 is provided with a tapered portion 12 and a threaded portion 13 to which the portion 14 of the connecting means 11 is threadedly attached. The opening 10 in the housing 7 is also provided with a tapered side wall 15 adapted to receive the head of said portion 14.

The connecting means 11 in this instance comprises the portion 14 which is a tubular member having a threaded portion 16 adjacent one end which is threadedly connected with the internal threaded portion 13 of the member 8 and having an enlarged head 17 adjacent its opposite end. The head portion 17 has a slot 18 therein adapted to receive a tightening tool such as a screwdriver and a tapered side wall 19 which is adapted to frictionally engage and lock with the tapered wall 15 of the opening 10 when the parts are in secured relation with each other. The tubular member 14 is provided internally of its bore with a wad or disc of solder or other suitable means 20 which is pressed into frictional engagement with the wall of the bore so that it will be permanently held therein.

After the parts have been tightened into proper relation with each other a lock pin 21 having a tapered head 22 is pressed into telescoped relation with the tubular member 14 and is held and anchored therein by subjecting the parts to heat of such a temperature as to cause the solder wad or disc 20 to melt and flow between the tube 10 and pin 21. The parts are then allowed to cool while held in said relation to permit the solder to harden and adhere and lock the pin in said tube.

The tapered head 22 when forced internally of the bore of the tube 14 spreads the end of said tube and frictionally locks the threaded portion with the tapered wall 12. This locks the tube against backing out and becoming loose during the use of the mounting. A plurality of slots 23 are formed in the peripheral edge of the tube to aid the spreading function of the tapered head 22. The pin 21 is provided with a circumferential groove 24 adjacent its headed end to limit the flow of the solder between the parts 14 and 21 when the solder wad or disc is melted.

The housing member 7 is also provided with a perforated wing portion 25 which forms a hinge connection for the temple 4.

The temple 4 is provided with spaced wing members 26 and 27, each having an opening therein which when the parts are in proper assembled relation with each other are aligned with the perforation in the wing 25.

The opening in the wing member 26 has a threaded wall adapted to receive the threaded portion 28 of the pivot portion 29 of the connecting means 30. The opening in the wing member 27 has a tapered side wall 31 with which the tapered head of the pivot portion 29 is frictionally engaged when the said portion is tightened in place in the aligned openings. The head of the pivot portion 29 has a slot 32 therein adapted to receive a tightening tool such as a screwdriver. The pivot portion 29 has a central bore 33 in which a wad or disc of solder or other suitable means 34 is held by friction. The central bore is adapted to receive a lock pin 35 having an enlarged head 36 which after the parts are tightened in proper relation with each other is held under pressure with its head 36 engaging the peripheral edge of the opening in the wing member 26. While held under pressure the parts are subjected to heat of such a temperature as to cause the wad or disc 34 of solder or other suitable means to melt and flow between the pin 35 and internal wall of the bore 33. The parts are held in the relation and allowed to cool to permit the solder to harden and lock the parts together. The lock pin 35 is adapted to hold the member 29 against backing out and becoming loose during the use of the mounting.

The pin 35 is provided with a circumferential groove 37 which limits the flow of the solder during the heating of the parts and is adapted to prevent its flowing between the threaded connection 28 of the portions 26 and 29.

It is apparent that either of the above described connecting members 11 and 30 may be used for the split rim or temple connection as desired and that both structures are such that they may be retightened when the working parts become worn without having to first loosen the anchor pins 21 or 35 as the case may be. After the connecting members have been retightened they may be anchored against loosening by again subjecting the parts to heat to soften the solder and simultaneously exerting a pressure on the anchor pins so that the said pins will move into binding relation with the parts. The heat is then shut off, and the parts are held under pressure until the solder cools and holds the pins in their adjusted position.

In Figures V and VI there is shown a modified form of connecting means applied to a rimless lens strap. The lens strap is of the usual construction having lens clamp members 38 and 39 between which the lens 6 is mounted. The clamp members are each provided with an opening in aligned relation with an opening in the lens and are secured to the lens by a connecting member 40 which extends through said aligned openings.

The connecting member 40 is similar to those previously described above except that the pin 41 has a tapered head 42 which when forced internally of the bore of the tubular member 43 is adapted to force the threaded portion 44 of said tubular member into frictional engagement with the internal threaded bore of the opening in the clamp member 38. The threads are such that when the end of the tube 43 is spread the tapered sides of the threads of said tube and the threads of the bore are forced into frictionally locked relation with each other. The pin 41 is held in place by a wad or disc of solder or similar means 45 which is heated in a manner similar to that previously described above, so that the said solder will flow between the pin and tube and when allowed to cool will adhere thereto and integrally unite the same.

The head 46 of the tube is provided with a tapered side wall which is drawn into frictional engagement with the tapered wall of the opening in the clamp member 39 by tightening the thread connection in a manner similar to that described in the previous constructions.

It is to be understood that any of the connecting members shown and described above may be used for the split rim, temple or lens strap connections as desired and that the said connecting members, as shown in the drawings, merely illustrate the relation of the parts prior to their being subjected to the heat treatment which causes the solder wads or discs to melt and flow between the pins and tubes.

In Fig. VII there is shown another modified form of anchor pin 47 which in this instance is provided with a tapered end 48 and a straight sided portion 49 so dimensioned with respect to the size of the opening in the threaded tubular member 50 that when the pin is pressed in the tube the tapered portion 48 functions to spread the end of the tube and permit the entrance of the straight sided portion 49 which is adapted to permanently hold the end of said tube in its spread position. This spreading of the end of the tube forces the threaded portion thereof into frictional engagement with the threaded bore in the means to which it is connected and thereby holds the tube from backing out and becoming loose. The straight portion 49 also functions to hold the pin in the bore of the tube when the parts are assembled.

The structure shown in Fig. VIII is similar to that shown in Fig. VII except that the threaded opening 51 in the means to which the connecting tube 52 is attached is tapered and the pin 53 is so tapered that it spreads the end of the tube and forces the threaded portion thereof into frictional engagement with the threads of the opening 51. The pin 53 is also provided with straight sided end portions 54 and 55 which hold the said pin in place in the bore of the tube when the parts are assembled and which also maintains the spread of the tube.

The structure shown in Fig. IX is similar to that shown in VI except that the internal bore 56 of the tube 59 is threaded. The pin in this instance is threaded and has an enlarged tapered head 57 formed with a slot 58 therein by which the pin may be threaded into the bore and the tapered head thereof drawn into said bore. This causes the end of the tube to spread and causes the threaded portion 60 thereof to frictionally lock with the means to which it is connected.

All of the above devices are so constructed that the tubular portions thereof may be tightened until the operable and separable parts are in proper relation with each other and may thereafter be locked against backing out and becoming loose.

The tapered heads of the tubes which are drawn into frictional contact with the tapered openings in the parts to be connected also provide means in addition to the pins for aiding in holding the parts from becoming loose.

In all of the structures shown and described above, the looseness of the parts due to wear may be taken up during the use of the devices and the connecting members may thereafter be tightened without having to disunite the pin and tubular members. After the tubular members have been retightened to take up the looseness, the pin members are merely forced further into the bore of said tubes to anchor them in place. In the case of the solder structures described above the parts are first heated to soften the solder and the pin members are then readjusted.

From the foregoing description it will be seen that simple, efficient and economical means and methods have been provided for accomplishing all of the objects and advantages of the invention.

Having described my invention, I claim:

1. In an ophthalmic mounting, means for connecting the separable parts of such mountings having aligned openings therein, one of which is provided with a threaded bore, comprising a tubular member having an enlarged head portion adjacent one end and a threaded portion adjacent its opposite end, said tubular member being adapted to be placed in the aligned openings and be threaded into the threaded bore to draw its head into binding relation with and to secure the said separate members together, said tubular member having a wad of solder pressed internally thereof and into frictional binding relation with its inner walls so as to span the opening therein and be carried by said tubular member as a part thereof, and binding means having a portion adapted to be inserted in the hollow bore of the tubular member so as not to traverse the wad of solder and so that its inner end will be located adjacent the wad of solder when the parts are assembled whereby the said assembled parts may be subjected to heat to cause the wad of solder to melt and flow between the inner walls of the tubular member and the binding means in said tubular member and when cool to harden and adhere thereto and integrally unite the same, the relation of the solder with the binding means and tubular member being such that when heat is applied thereto the solder will not flow between the inter-threaded parts.

2. In an ophthalmic mounting, means for connecting the separable parts of such mountings having aligned openings therein, one of which is provided with a threaded bore, comprising a tubular member having an enlarged head portion adjacent one end and a threaded portion adjacent its opposite end, said tubular member being adapted to be placed in the aligned openings and be threaded into the threaded bore to draw its head into binding relation with and to secure the said separate members together, said tubular member having a wad of solder pressed internally thereof and into frictional binding relation with its inner walls so as to span the opening therein and be carried by said tubular member as a part thereof, and binding means having a portion adapted to be inserted in the hollow bore of the tubular member so as not to traverse the wad of solder and so that its end will be located adjacent the wad of solder when the parts are assembled whereby the said assembled parts may be subjected to heat to cause the wad of solder to melt and flow between the inner walls of the tubular member and the binding means in said tubular member and when cool to harden and adhere thereto and integrally unite the same, one of said walls having an annular groove forming a recess for restricting the flow of solder under capillary attraction, the relation of the solder with the binding means and tubular member being such that when heat is applied thereto the solder will not flow between the inter-threaded parts.

CHARLES O. COZZENS.